US007737860B2

(12) United States Patent
Banta et al.

(10) Patent No.: US 7,737,860 B2
(45) Date of Patent: Jun. 15, 2010

(54) SYSTEMS AND METHODS FOR MONITORING AUTOMATIC DOORS

(75) Inventors: Kevin D. Banta, Cedar Hills, UT (US); D. George Field, Pleasant Grove, UT (US); E. Carl Goodman, Bountiful, UT (US)

(73) Assignee: WON-DOOR Corporation, Salt Lake City, UT (US)

( * ) Notice: Subject to any disclaimer, the term of this patent is extended or adjusted under 35 U.S.C. 154(b) by 294 days.

(21) Appl. No.: 11/871,772

(22) Filed: Oct. 12, 2007

(65) Prior Publication Data

US 2009/0096622 A1 Apr. 16, 2009

(51) Int. Cl.

| | |
|---|---|
| ***G08B 3/00*** | (2006.01) |
| ***G08B 5/00*** | (2006.01) |
| ***G08B 7/00*** | (2006.01) |
| ***G08B 9/00*** | (2006.01) |
| ***G05D 3/00*** | (2006.01) |
| ***E05B 53/00*** | (2006.01) |

(52) U.S. Cl. .............................. 340/691.6; 340/286.02; 318/466; 49/24

(58) Field of Classification Search ............ 340/286.01, 340/286.02, 686.1, 691.6; 49/24, 163, 168; 318/466-470; 52/1

See application file for complete search history.

(56) References Cited

U.S. PATENT DOCUMENTS

| | | | | |
|---|---|---|---|---|
| 6,310,548 | B1 * | 10/2001 | Stephens et al. | 340/540 |
| 6,481,156 | B1 * | 11/2002 | Richmond | 49/24 |
| 7,181,369 | B2 * | 2/2007 | Kanki et al. | 702/188 |
| 2006/0101721 | A1 | 5/2006 | Weik, III et al. | |
| 2008/0037579 | A1 * | 2/2008 | Lee et al. | 370/463 |

FOREIGN PATENT DOCUMENTS

| | | |
|---|---|---|
| KR | 0637869 | * 10/2006 |

* cited by examiner

*Primary Examiner*—Jennifer Mehmood
(74) *Attorney, Agent, or Firm*—TraskBritt

(57) ABSTRACT

Methods and systems are provided for monitoring an automatic door system. In one embodiment, an automatic door system may include a door system controller coupled to one or more input devices. The door system controller may be configured to receive data representative of an operational parameter of the automatic door system. At least one monitor display may be operably coupled to the door system controller and configured to display information regarding the operational parameter of the input devices. A remote display device interface may be configured to operably couple at least one remote display device to the door system controller. The at least one monitor display may be configured to automatically change from a master configuration to a slave configuration when the at least one remote display device is operably coupled to the door system controller.

25 Claims, 10 Drawing Sheets

SYSTEMS AND METHODS FOR MONITORING AUTOMATIC DOORS

TECHNICAL FIELD

Embodiments of the present invention relate generally to monitoring automated systems, and, more particularly, to monitoring automated doors and networks of automated doors.

BACKGROUND

Automatic doors are frequently used for security and safety purposes and may be implemented in various configurations, such as sliding doors, rotating panel doors, folding doors, or revolving doors. For example, referring to FIGS. 1 and 2, one example of an automatic door system 100 includes one or more accordion-type doors 102A/102B and may be used for security and/or safety purposes. Doors 102A/102B may be formed with a plurality of panels 104 connected to one another with hinges or hinge-like members 106. Hinges 106 may allow for doors 102A/102B to be folded and compactly stored in a pocket 108 formed within walls 110. Furthermore, doors 102A/102B may be driven by a motor 114 along a track 116 to join with one another in order to provide an appropriate barrier to secure an area.

The automatic door system 100 may further include input devices such as sensors and switches (not specifically shown), which may assist in the control and operation of doors 102A/102B. The input devices may be coupled to, and in communication with, an automatic door system controller or control box 118. For example, automatic door system 100 may include a sensor for determining whether AC power is being supplied to motor 114. In another example, automatic door system 100 may include a sensor for determining whether a back-up battery contains an adequate charge to provide power to a motor 114 in the event that there is a loss of AC power. Automatic door system 100 may also include a leading edge sensor for detecting an obstruction in the door's path when the door is being closed. Furthermore, the automatic door system 100 may include what is known as "panic hardware" or a device that allows a predetermined amount of time during which a trapped person may escape through doors 102A/102B.

The failure of one or more components of automatic door system 100 (e.g., a batter pack, a power supply, or one or more input devices) may cause a system malfunction at a critical moment. Therefore, in order to ensure proper operation of automatic door system 100, a monitoring system may be integrated within control box 118. In the instance that an input device reports a malfunction or an emergency event, the monitoring system may report the malfunction or other event to an end-user. Because control box 118 is conventionally located inside pocket 108 for protection and security reasons, the monitoring system may be difficult to access in order to obtain information regarding a fault or alarm condition.

Some monitoring systems, due to difficulty in physically accessing such systems, utilize audio devices to identify faults and/or alarms. Although these monitoring systems are capable of providing fault or alarm data to the end-user, the data is typically difficult to decipher because each fault or alarm is conventionally designated by a different series of beeps. For example, a "one-one-three" beep pattern (a single distinct beep, followed by another single distinct beep, followed by three closely spaced beeps) may indicate that a battery has a low charge while a "one-two-one" beep pattern may indicate low AC voltage. When a user hears a series of beeps, the user must often turn to an owner's manual or contact a supplier or a maintenance company to determine which fault or alarm is being described by the series of beeps and then determine the necessary steps to repair or to further diagnose the problem.

In some instances, rather than relying on a series of beeps or other audible signals to provide information regarding the operation of a door, monitoring systems have been developed wherein fault and alarm data is provided in visual form. U.S. Patent Application Publication No. US 2006/0101721, to Weik, III et al., for example, discloses an active oxygen management, fire encirclement, and operational verification system. The operational verification system includes a programmable door controller through which tests are planned, conducted and reported to a remote location. The data relating to the test or alarm may be sent to a remote location automatically and stored locally in the door's controller. The data stored locally can be accessed by manually initiating a scrolling sequence of messages for the local user.

While monitoring systems such as the one disclosed by Weik, III et al. are alleged to be successful in monitoring for faults discovered after testing, they appear to be insufficient for automatically providing end-user warnings to both a local location (e.g., near the door) as well as a remote location. Furthermore, it appears that such a system fails to provide instructions to an end-user to enable the end-user to fix or further diagnose the problem. Additionally, in the case where the door is not connected to a remote monitor or controller, or where a connection with such a remote device malfunctions, it does not appear that the local monitoring display automatically notifies the end-user about a fault that may cause the door to malfunction. Such a fault in one of the door's components or subsystems may remain undiscovered by the end-user until maintenance personnel manually inspects the door's reports.

There is a need for methods and systems for monitoring an automatic door and a network of automatic doors. More specifically there is a need for providing a monitoring system with local and remote displays configured to provide information relating to the operation of at least one automatic door.

BRIEF SUMMARY OF THE INVENTION

Various embodiments of the present invention are directed towards monitoring an automated system such as, for example, an automatic door system.

One embodiment of the present invention comprises a monitoring system for automatic doors. The system comprises at least one automatic door system including at least one door and at least one input device configured to sense data representative of an operational parameter of the door system. The system further includes a door system controller operably coupled to the at least one input device and configured to receive the data representative of the operational parameter of the automatic door. Furthermore, the system includes at least one remote display device interface operably coupled to the at least one door system controller and configured to be operably coupled to at least one remote display device. In addition, the system includes at least one monitor display operably coupled to the at least one door system controller and configured to display information representative of the operational parameter of the door. Additionally, the at least one monitor display is configured to automatically switch from a master configuration to a slave configuration when the at least one remote display device is operably coupled to the at least one remote display device interface.

Another embodiment of the present invention comprises a method of monitoring an automated system. The method includes providing at least one door system controller having at least one has an input device interface and a display interface. The method further includes coupling the at least one input device to the input device interface, coupling a monitor display to the display interface, and coupling a remote display device interface to the display interface. The remote display device interface is configured to couple a remote display device operating as a master device to the at least one door system controller. The method also includes transferring data representative of the operational parameter from the input device to the at least one door system controller. Moreover, the method includes configuring the monitor display to operate as a master device when the remote display device is not coupled to the remote display device interface and operate as a slave device when the remote display device is coupled to the remote display device interface. Furthermore, the method includes sending a description of the operational parameter to the master device and displaying the description of the operational parameter.

Another embodiment of the present invention comprises a network of automatic door systems. The network includes at least one communication line and a plurality of automatic door systems operably coupled to the at least one communication line. Each of the plurality of automatic door systems includes at least one door, at least one input device configured for determining at least one operational parameter of the automatic door system and a door system controller operably coupled to the at least one input device. The door system controller is configured to request and receive data representative of the at least one operational parameter of the automatic door system from the at least one input device. The door system controller also includes at least one monitor display, wherein the at least one monitor display is configured to display indicia of the data representative of the operational parameter and wherein the at least one monitor display is configured to switch from a master mode to a slave mode upon detection of a master device in communication with the at least one communication line.

Yet another embodiment of the present invention comprises a method of monitoring a network of automatic door systems. The method comprises establishing a communication line between a plurality of automatic door systems, wherein each automatic door system of the plurality of automatic door systems includes a door system controller having at least one monitor display configured to switch from a master mode to a slave mode upon detection of a master device on the communication line. Information is requested from the automatic door system controller of the plurality, wherein the information is related to an operational parameter of an automatic door system of the plurality of automatic door systems. The information is displayed on a display device. In some embodiments, the information, or a description or indicia thereof, may be displayed in the monitor display when operating as either the master or the slave. The information may include component status, system faults and alarm events associated with the system. End-user instructions relating to the faults and alarms may also be provided.

DETAILED DESCRIPTION OF THE INVENTION

Figure 1:
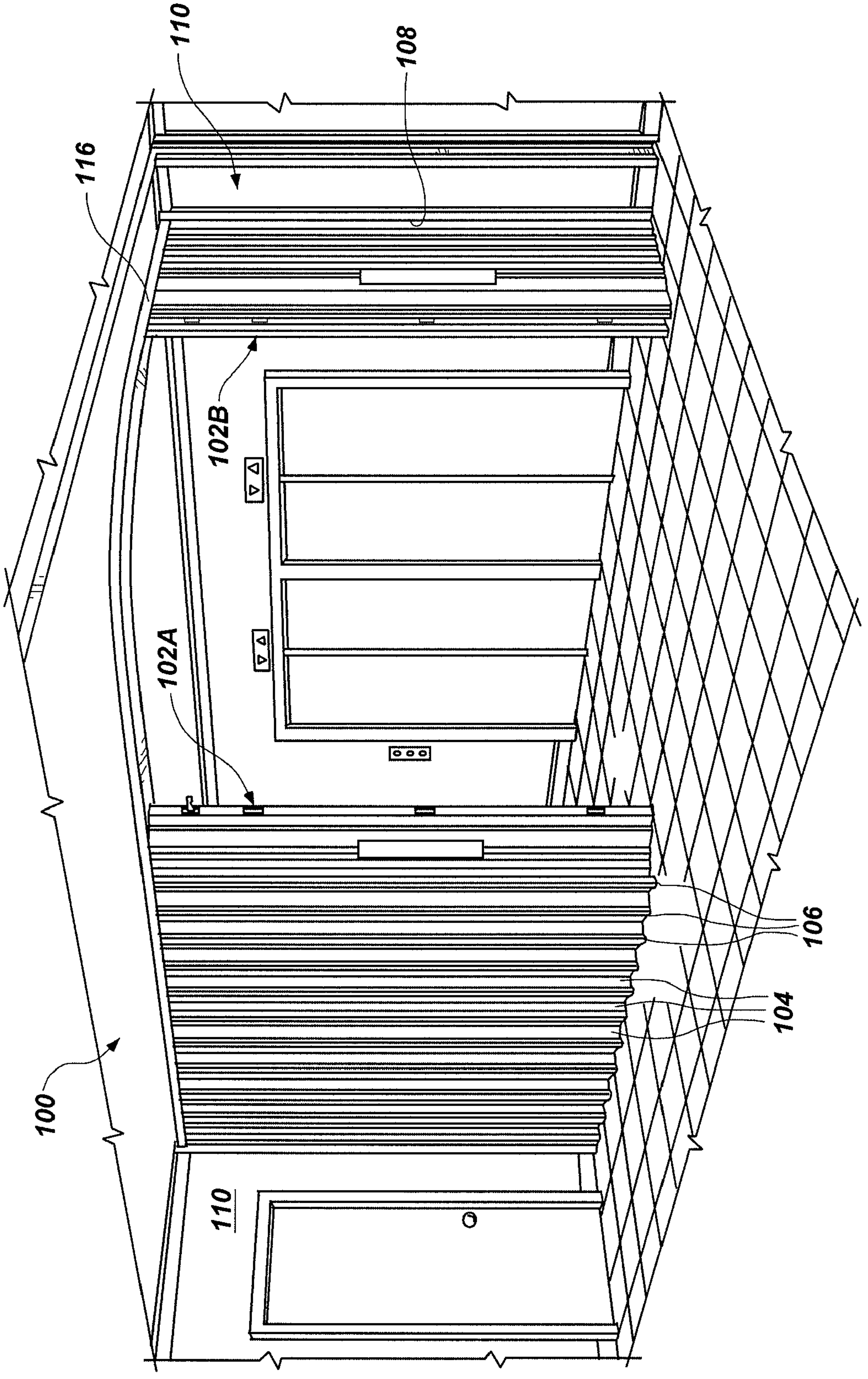
FIG. 1 (PRIOR ART)
FIG. 1 is an illustration of a prior art automatic door system.
Figure 2:
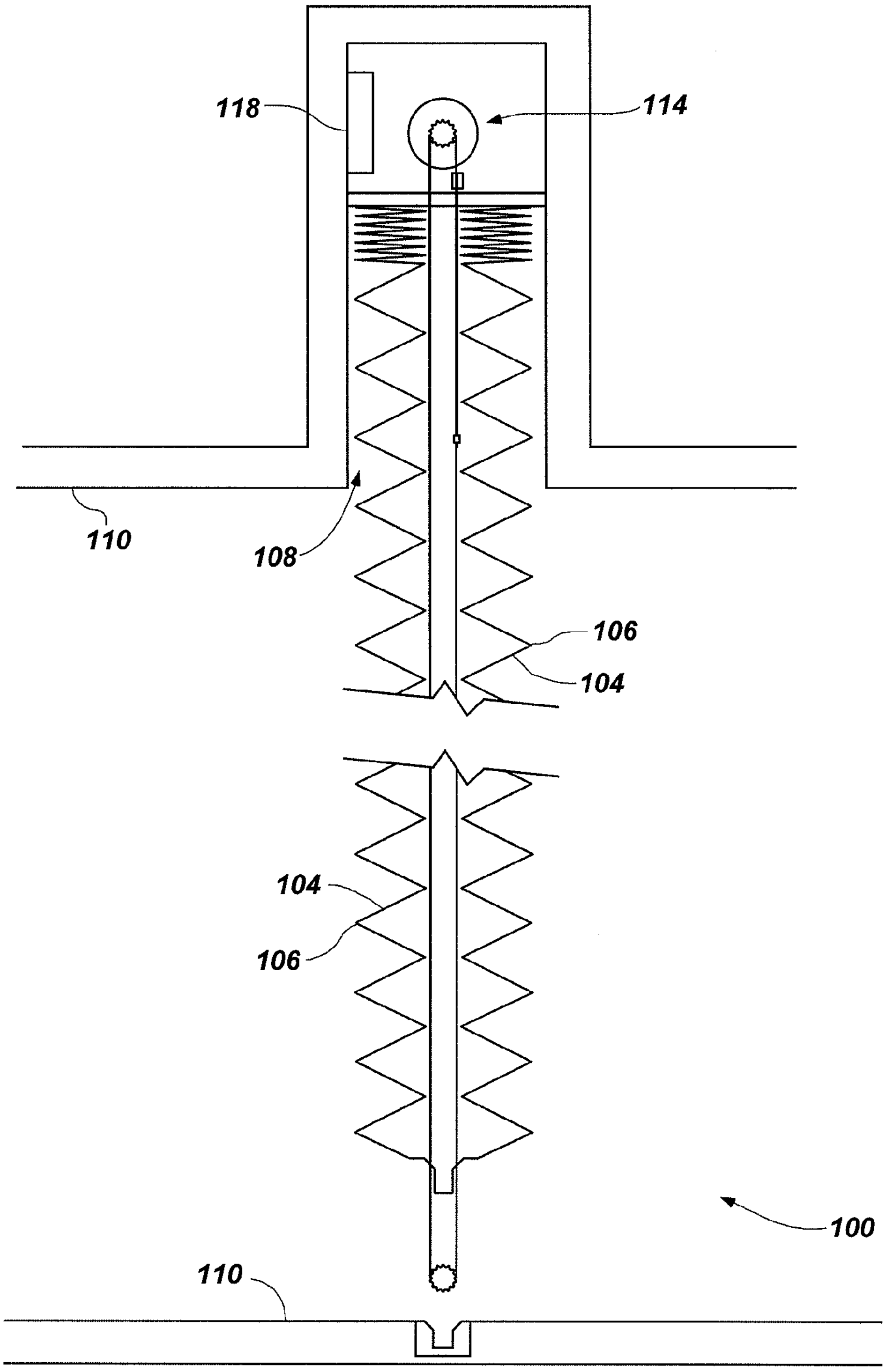
FIG. 2 (PRIOR ART)
FIG. 2 is a plan view of the automatic door system shown in FIG. 1.

In the following detailed description of the invention, numerous specific details are set forth in order to provide a thorough understanding of the invention. However, the invention may be practiced without these specific details. In some instances, well-known methods, procedures, and/or components have not been described in detail so as not to unnecessarily obscure aspects of the invention.

Various embodiments of the present invention may be implemented by hardware, software, firmware, middleware, microcode, or a combination thereof. When implemented in software, firmware, middleware, or microcode, the program code or code segments to perform the described tasks may be stored in a computer-readable medium such as a storage medium or other storage means. A computer-readable medium includes, but is not limited to, magnetic and optical storage devices such as disk drives, magnetic tape, CDs (compact disks), DVDs (digital versatile discs), and semiconductor elements such as RAM, DRAM, ROM, EPROM, and Flash memory.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

It is noted that the drawings and description herein, such as in the subsequent description, may refer to and illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal. Furthermore, the signal may be implemented as a physical connection between two elements or a wireless connection between two elements.

In the following description, certain terminology is used to describe certain features of one or more embodiments of the invention. For instance, the term "monitor display" refers to any display device capable of visually displaying words, symbols, pictures or other indicia. A "remote display device" refers to any device remote from the door system and capable of visually displaying words, symbols, or pictures. A "remote display device" also includes any device that is readily coupled to and decoupled from the monitoring system such as a portable or hand-held display device. The "remote display device" may also include a device configured as an input device and capable of providing instructions to other components including, for example, a system controller.

Figure 3:
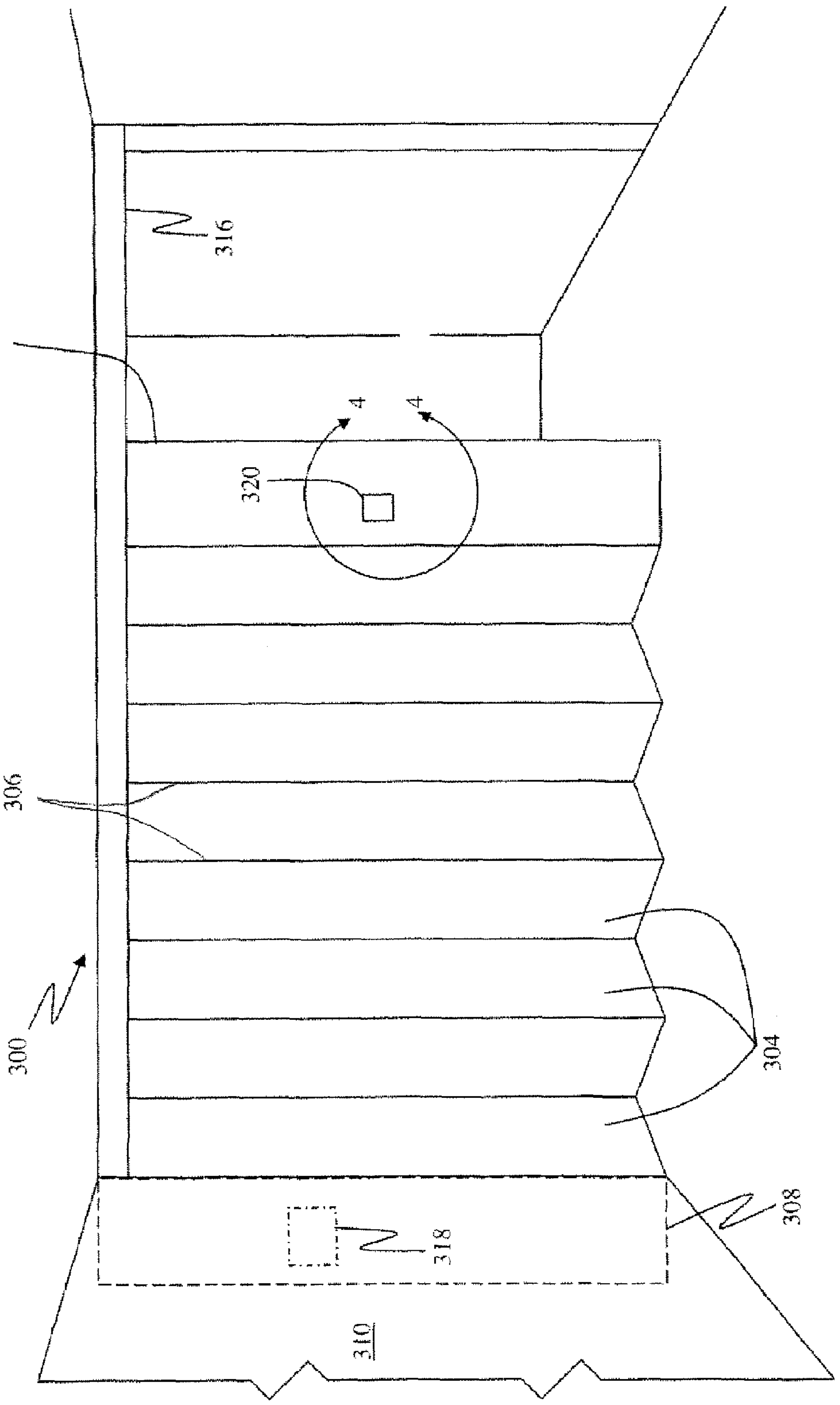
FIG. 3 is an illustration of an automatic door system in accordance with an embodiment of the present invention.

Referring to FIG. 3, an automatic door system 300 in accordance with an embodiment of the present invention is illustrated. Although automatic door system 300 may comprise a folding door or an accordion-like door 302, the present invention may be adapted to various embodiments of automatic door systems and other movable doors or partitions. In certain embodiments, a folding door 302 may be used, for example, as a security door, as a fire door, or as any combination thereof. In other embodiments, a folding door 302 need not be utilized as a fire or security door, but may be used simply for subdividing a larger space into smaller rooms or areas. The folding door 302 may be formed with a plurality of panels 304 connected to one another with hinges or other hinge-like structures 306 in an alternating pattern. The hinged connection enables the panels 304 to fold relative to each other in an accordion manner such that the folding door 302 may be retracted or folded and compactly stored in a pocket 308 formed in a wall 310 or other structure. To deploy the folding door 302, a motor (not shown in FIG. 3) may drive the folding door 302 along a track 316.

The automatic door system 300 may also include a monitoring system configured for monitoring operational parameters of the automatic door system 300. The monitoring system may include a door system controller 318, a monitor display 320, an optional remote display device, one or more audio transducers (e.g., a speaker), and various input devices, such as sensors and switches (none shown in FIG. 3). The input devices may be used in association with the control of a variety of functions of automatic door system 300 and may be distributed at various locations in and around automatic door system 300. In addition, the input devices may be operably coupled to a door system controller 318. While door system controller 318 is shown located inside the pocket 308, those of ordinary skill in the art will recognize that door system controller 318 may be disposed at a variety of locations relative to folding door 302.

Furthermore, the automatic door system 300 may include a monitor display 320 operably coupled to the door system controller 318 and configured to receive and display data relating to the input devices as well as other operational data. Although the monitor display 320 is shown positioned on a panel 304 of folding door 302, those of ordinary skill in the art will recognize that the monitor display 320 may be positioned at a variety of locations relative to the folding door 302. For example, the monitor display 320 may be disposed within wall 310 or other structure in which the folding door 302 is located. The monitor display 320 may communicate with the door system controller 318 through any method known in the art, such as, but not limited to, a digital bus, a wireless communication, or fiber optic communication.

Figure 4:
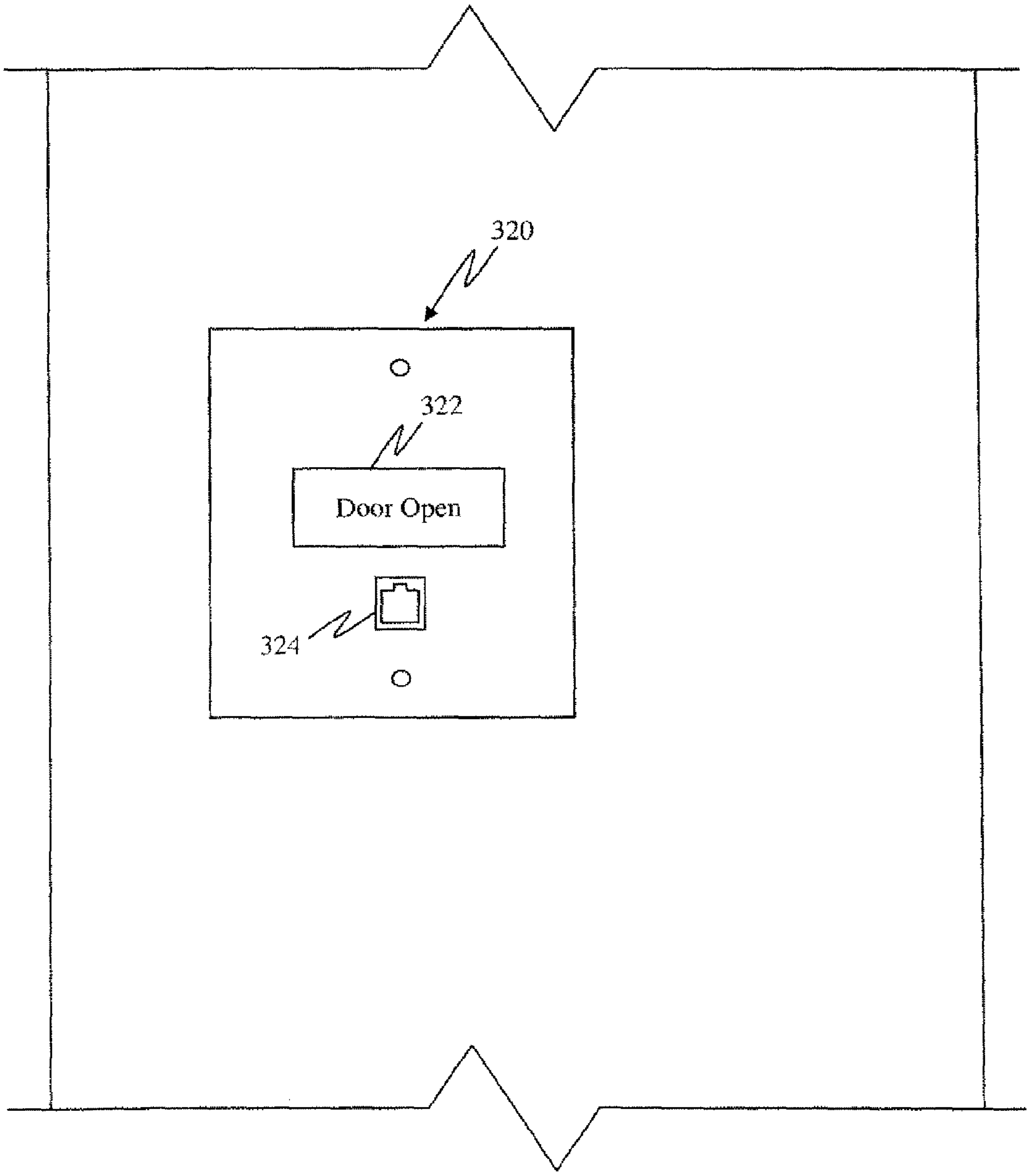
FIG. 4 is a detail view of a monitor display in accordance with an embodiment of the present invention.

Referring now to FIG. 4, an enlarged view of a portion of the monitor display 320 is shown. The monitor display 320 may include a visual display 322 configured to display visual messages to an end-user regarding data relating to the status and operation of various components of automatic door system 300. For example only, and not by limitation, the visual display 322 may comprise an LCD display. The visual messages may include text messages or other visual indicia describing or indicating a fault, alarm, or condition that a component of the automatic door system 300 is experiencing. For example, the visual message may inform the end-user that the folding door 302 is open, a back-up battery has a low voltage, the back-up battery has failed, the AC voltage of a power supply is low, the door path is obstructed, the panic hardware is malfunctioning, a fire or security alarm has been activated, or any other message relevant to the door's operation or status.

The visual display 322 may further display messages to an end-user including instructions as to how to respond to a fault, alarm or other condition reported by the door's monitoring system. For example, in one embodiment, the folding door 302 may include a sensor, whether mechanically, electrically or optically actuated, that, when actuated, provides an appropriate signal representative of such actuation and indicating that a door path is obstructed. Thus, if the folding door 302 is experiencing a door path obstruction fault, the visual display 322 may provide an end-user with remedial instructions. For example, the visual display 322 may advise the end-user to inspect the door path and, if the door path is clear, to inspect the sensor (or some component thereof). In a more specific example, the sensor may be associated with a displaceable member adjacent the leading edge of the folding door 302. Thus, the visual display 322 may provide instructions regarding maintenance of the displaceable structure. As another example, the visual display 322 may inform the end-user that, if the fault stops after displaceable structure has been placed in its proper operating position, the displaceable structure may be sticking or otherwise malfunctioning and should be inspected, and possibly repaired, by maintenance personnel.

It will be apparent to one of ordinary skill in the art that many variations of faults, alarms, and instructions may be provided through the visual display 322 of the monitor display 320. Therefore, the examples of faults, alarms, and instructions described herein should not be considered to limit the scope of the invention.

The monitor display 320 may further include a remote display device interface 324 configured for coupling a remote display device (not shown in FIG. 3) to door system controller 318. In one embodiment, the remote display device interface 324 may communicate with the door system controller 318 in the same manner as that of the monitor display 320. In other words, when a remote display device is connected to the interface 324, the monitor display 320 and the remote display device may use a common communication means. Although the remote display device interface 324 is illustrated as an RJ45 connector, those of ordinary skill in the art will recognize that other suitable communications connectors may be used.

Figure 5:
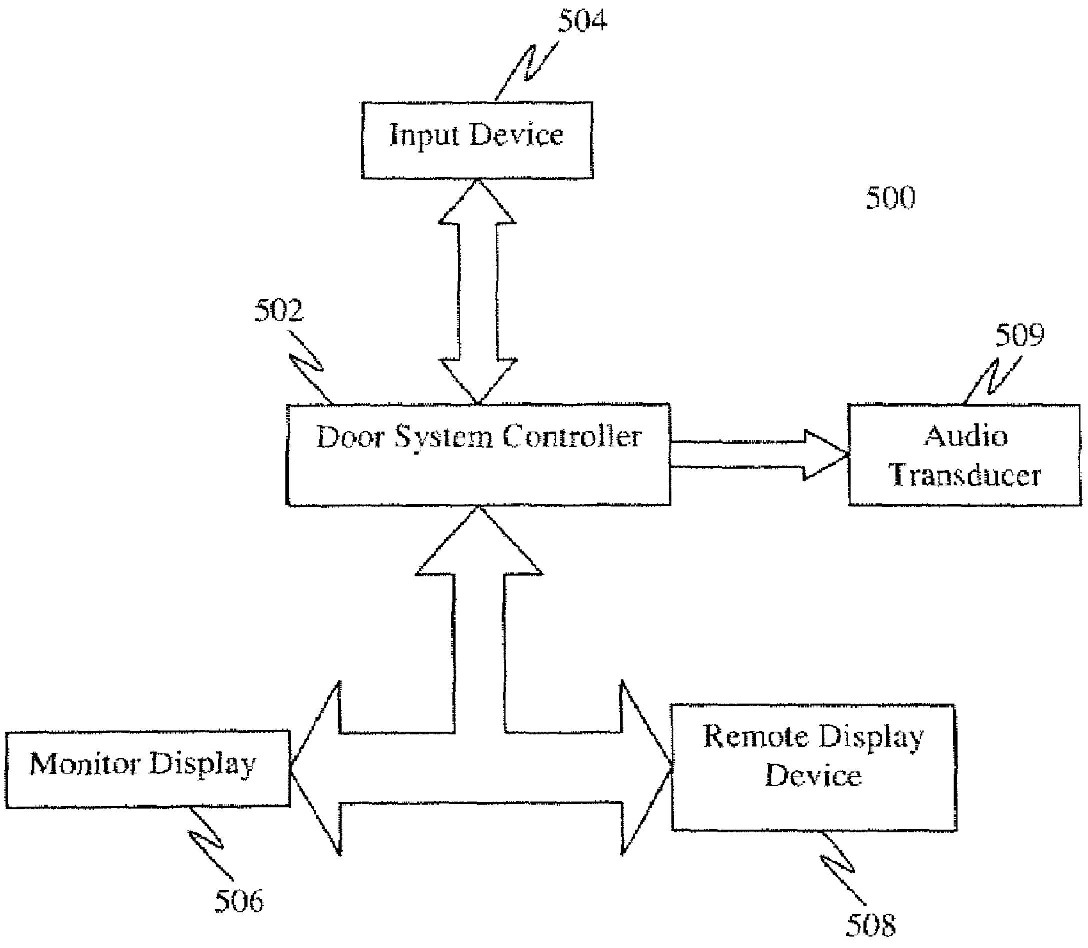
FIG. 5 is a block diagram of a monitoring system according to an embodiment of the present invention.

Referring now to FIG. 5, a block diagram is shown illustrating the components of a monitoring system 500 according to one embodiment of the present invention. The monitoring system 500 may include a door system controller 502 (which may include, for example, the door system controller 318 described with respect to FIG. 3) configured to send data to, and/or receive data from, one or more input devices 504. The monitoring system 500 may also include a monitor display 506 coupled to the door system controller 502 and configured to request and receive data from the door system controller 502. The monitor display 506 may further include a visual display 322 for displaying messages or indicia representative of data received relating to the operational parameters of folding door 302 (see FIG. 3). A remote display device 508 may be coupled to the door system controller 502 and configured to request and receive data from the door system controller 502 in a remote location. As described in more detail below, the remote display device 508 may be located within a remote computer or at any other location where it may be desirable to monitor an automatic door system. In another embodiment, remote display device 508 may be removably coupled to the door system controller 502 and used in relatively close proximity to an associated door.

In addition to transmitting data to the monitor display 506, the door system controller 502 may output audio content to one or more audio transducers 509 (e.g., speakers). Upon receipt of the audio content, the audio transducers 509 may provide audio messages representative of the data sent to the monitor display 506. The audio messages may be similar to the series of beeps as described above, or the audio messages may include pre-recorded verbal messages telling the end-user what fault or alarm may be occurring. A pre-recorded message may further include instructions relating to the fault or alarm similar to the instructions provided in the monitor display as described hereinabove.

Figure 6:
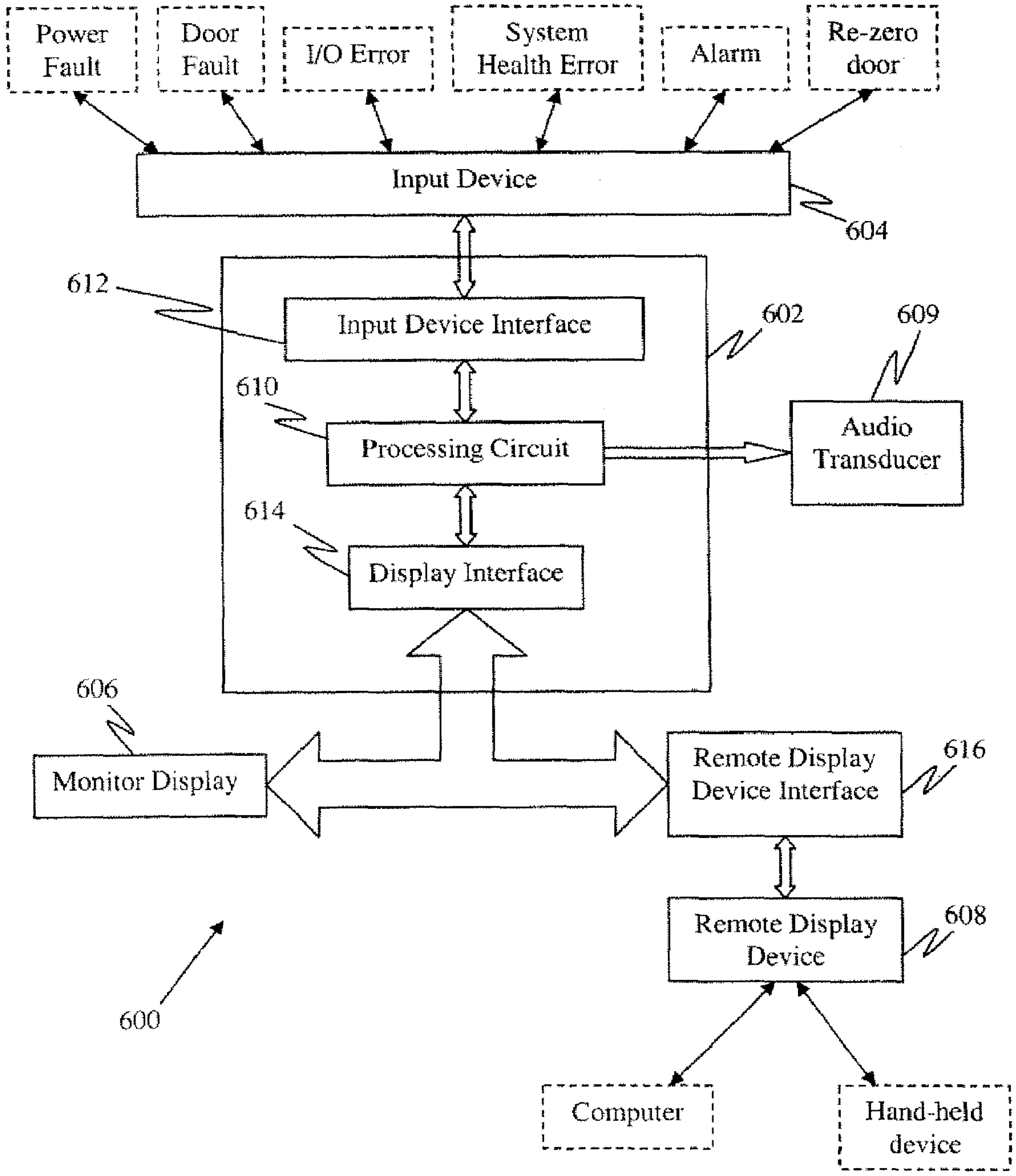
FIG. 6 is a block diagram illustrating a detailed example of a monitoring system according to an embodiment of the present invention.

Referring now to FIG. 6, a block diagram illustrating a detailed example of a monitoring system 600 according to one implementation is provided. The monitoring system 600 may include a door system controller 602 comprising a processing or control circuit 610 configured to control the operation of the monitoring system 600. The processing circuit 610 may be coupled to an input device interface 612 through which the processing circuit 610 may obtain, process and/or send monitoring or fault data to or from one or more input devices 604. The monitoring or fault data sent from the input device 604 may include, as non-limiting examples, power faults (e.g., back-up battery failure, AC voltage malfunction/failure, fuse failure), door faults (e.g., door is hindered, direction error, drive train failure, pathway obstruction), I/O (input/output) faults (e.g., stuck door block, panic hardware malfunction, limit switch malfunction, key switch malfunction), system health errors (e.g., errors in system memory, ROM, multiplexer (MUX) communication, firmware, or RAM), alarms (e.g., thermal lockout, security violation), and/or re-zero (e.g., calibration) door notices, among others.

The processing circuit 610 may also be coupled to one or more audio transducers 609 (e.g., speakers) and may be configured to provide audio content to the audio transducers 609 relating to the monitoring or fault data received from an input device 604. As discussed above, the audio content may include multiple distinct patterns of beeps which are representative of individual monitor or fault events. As previously noted, in some embodiments the audio content may also include pre-recorded messages describing a given monitor or fault event and/or providing end-user instructions.

The processing circuit 610 may also be coupled to a display interface 614 through which the processing circuit 610 may obtain, process and/or send monitoring or fault data to a monitor display 606 and a remote display device interface 616. The monitor display 606 may be configured to display visual information to an end-user regarding a fault or alarm experienced by the door system 300 (see FIG. 3). The remote display device interface 616 may be configured to couple a remote display device 608, such as a computer, hand-held device, or other input or output device to the display interface 614.

FIG. 6 depicts one embodiment wherein a monitor display 606 and a remote display device interface 616 share a common transmission pathway through a display interface 614. Such a configuration may simplify the monitoring system 600 and reduce cost since there is only one transmission line from the display interface 614 to the processor circuit 610. In one particular embodiment, it may be desirable for the monitor display 606 and the remote display device interface 616 to be configured so that only one of such devices is communicating with the processing circuit 610 at a given time.

When multiple devices (e.g., a monitor display 606 and a remote display device interface 616) or modules are networked to a single processor or processing circuit 610, a master/slave model may be employed in order to keep the devices from trying to communicate with the processing circuit 610 at the same time. In computer networking, a master/slave configuration is a model for a communication protocol in which one device or process (known as the master) controls one or more other devices or processes (known as slaves). Once the master/slave relationship is established, the direction of control is always from the master to the slave(s). The slave(s) do not communicate with the processor without the master first giving permission to the slave(s) to communicate.

In one embodiment of the present invention wherein the remote display device interface 616 may not include a remote display device 608 coupled thereto, the monitor display 606 may be configured to function as a master. When a remote display device 608 is coupled to the remote display device interface 616, the monitor display 606 may be configured to automatically switch to function as a slave device. Therefore, the remote display device 608 may communicate with the processor circuit 610 without any interference from the monitor display 606 (i.e., the remote display device 608 takes over as master and the monitor display 606 becomes the slave).

Figure 7:
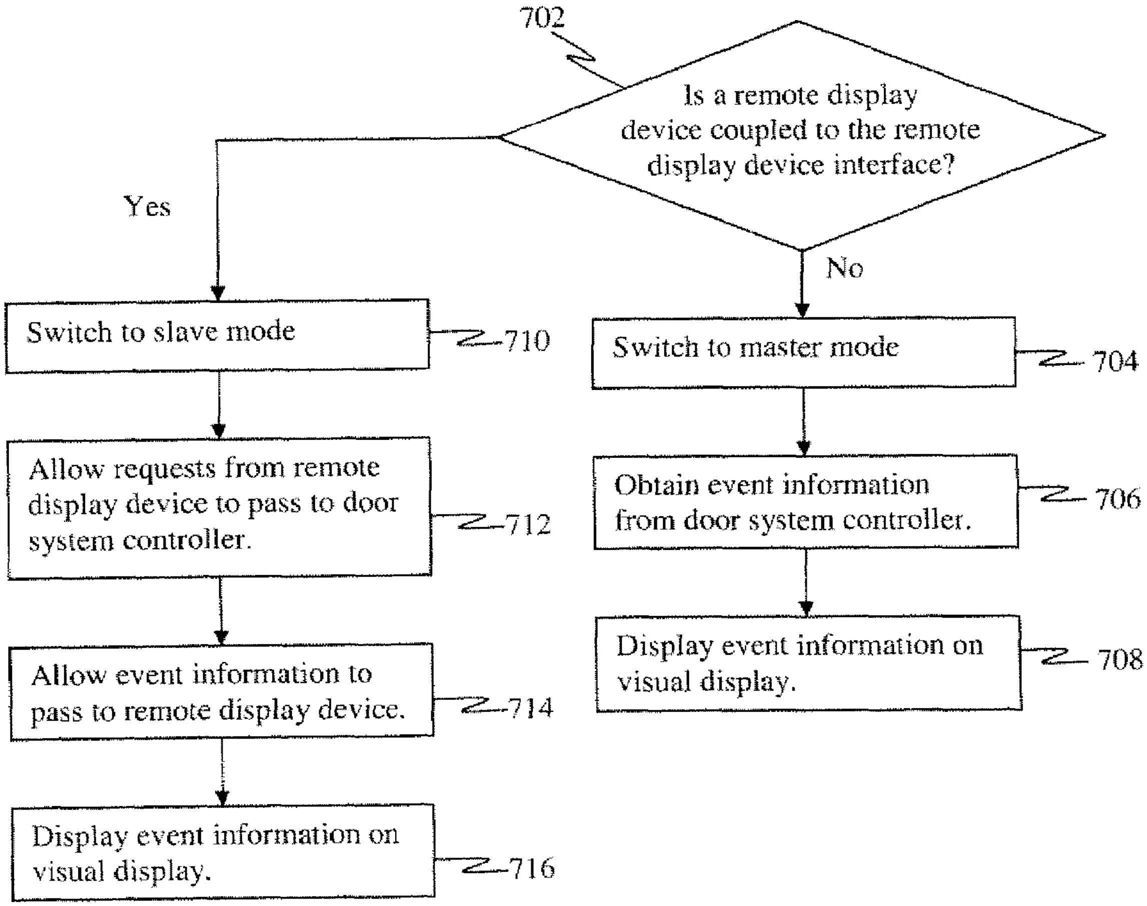
FIG. 7 is a flow diagram illustrating a method of operation for a monitor display in accordance with an embodiment of the present invention.

FIG. 7 is a flow diagram illustrating a method of operation for a monitor display according to one implementation of the present invention. A monitor display (e.g., monitor display 320, 506, 606) may detect whether a remote display device (e.g., remote display device 508, 608) is coupled to a remote display device interface as indicated at 702. The monitor display may detect a remote display device by detecting signals transmitted on the shared transmission pathway by receiving a signal generated by a mechanical or electrical switch in the remote display device interface (e.g., remote display device interface 324, 616), or any other method known in the art. If a remote display device is not coupled to the remote display device interface, the monitor display may switch to a master mode configuration if it was previously in a slave mode configuration as indicated at 704. If the monitor display was previously operating in a master mode configuration, it may remain in the master mode configuration. Once in master mode configuration, the monitor display may request and obtain event information from the door system controller (e.g., door system controller 318, 502, 602) as shown at 706. Upon receiving the event information from the door system controller, the monitor display may display the event information on the visual display as indicated at 708.

If the monitor display detects the presence of a remote display device coupled to the remote display device interface, the monitor display may switch to a slave mode configuration as shown at 710. If the monitor display was already in a slave mode configuration, it may remain in the slave mode configuration. With the monitor display operating in a slave mode configuration, the remote display device is enabled to request event information from the door system controller as indicated at 712. When the door system controller sends event information, the monitor display, operating in slave mode, enables the event information to pass to the remote display device as indicated at 714 without interference. The monitor display may also display the event information on its own visual display as indicated 716.

Figure 8:
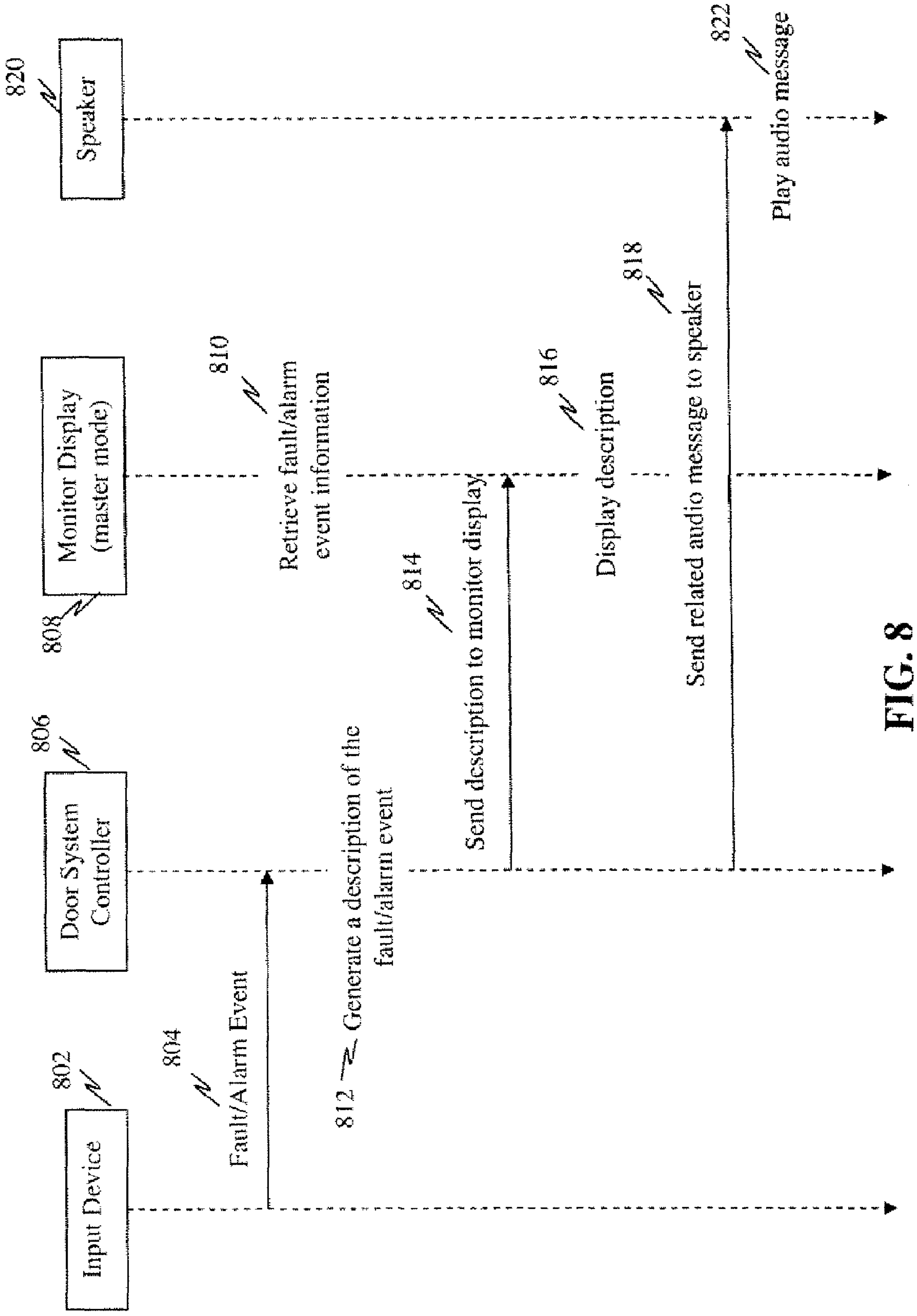
FIG. 8 is a flow diagram illustrating the flow of information during operation of a monitoring system according to an embodiment of the present invention.

FIG. 8 illustrates the flow of information during operation of a monitoring system according to an embodiment of the invention. An input device 802 may experience a fault or alarm event and may send fault/alarm information 804 to a door system controller 806. The fault or alarm event may be a malfunction with an operational parameter of an automatic door system, a malfunction with a component of the automatic door system, an emergency event such as a fire or security emergency, or simply a status check of one or more components of the automatic door system. A monitor display 808 may initiate retrieval of a description of the fault/alarm event 810. In this example, the monitor display 808 initiates retrieval of the description, and is, therefore, operating in the master mode configuration. The monitor display 808 may automatically switch to the master mode configuration in a manner similar to the method described in reference with FIG. 7 when, for example, no remote display device is coupled to the system. The door system controller 806 may then generate a description of a fault/alarm event 812 and send a description 814 to the monitor display 808 where the description is displayed 816. The door system controller 806 may also send an audio message related to a fault/alarm event 818 to a speaker 820 where the audio message is played 822.

Figure 9:
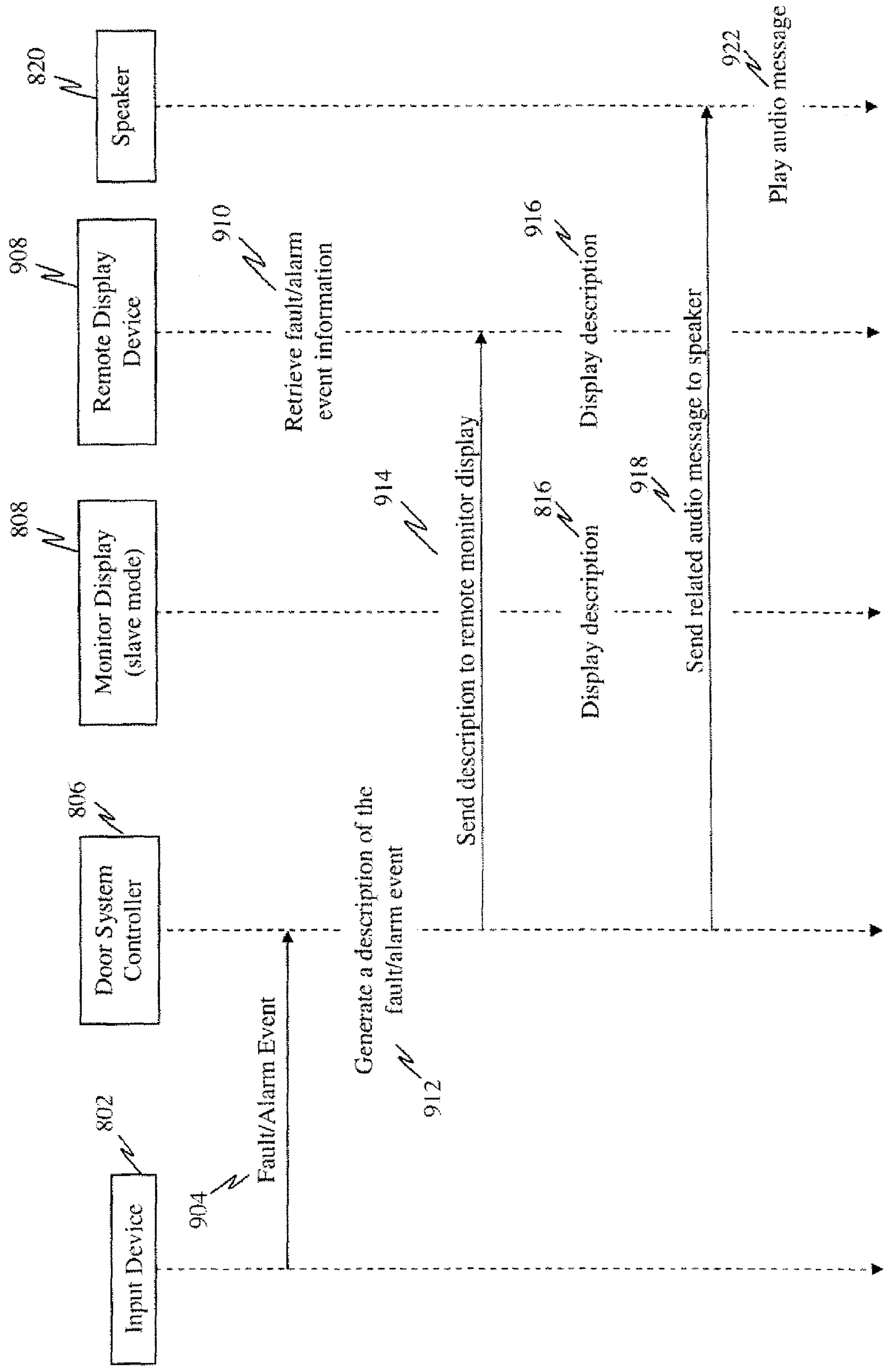
FIG. 9 is a flow diagram illustrating the flow of information during operation of a monitoring system having a remote display device in accordance with an embodiment of the present invention.

FIG. 9 illustrates a flow of information during operation of a monitoring system that includes a remote display device according to an embodiment of the invention. An input device 802 may experience a fault or alarm event or otherwise determine the status of a component of an automatic door system and send the event information 904 to the door system controller 806. The remote display device 908 may initiate retrieval of a description of the event 910. Since the remote display device 908 initiates retrieval of the event description in this example, the monitor display 808 is operating in the slave mode configuration. The monitor display 808 may automatically switch to the slave mode configuration in a manner similar to the method described with respect to the embodiment depicted in FIG. 7. The door system controller 806 may then generate a description of a fault/alarm event 912 and send the description 914 to the remote monitor display device 908 where the description is displayed 916. While in slave mode, the monitor display 808 may also display the fault/alarm event description 816. As discussed with respect to other embodiments described herein, the door system controller 806 may also send an audio message related to the fault/alarm event 918 to a speaker 820 where the audio message is played 922.

Figure 10:
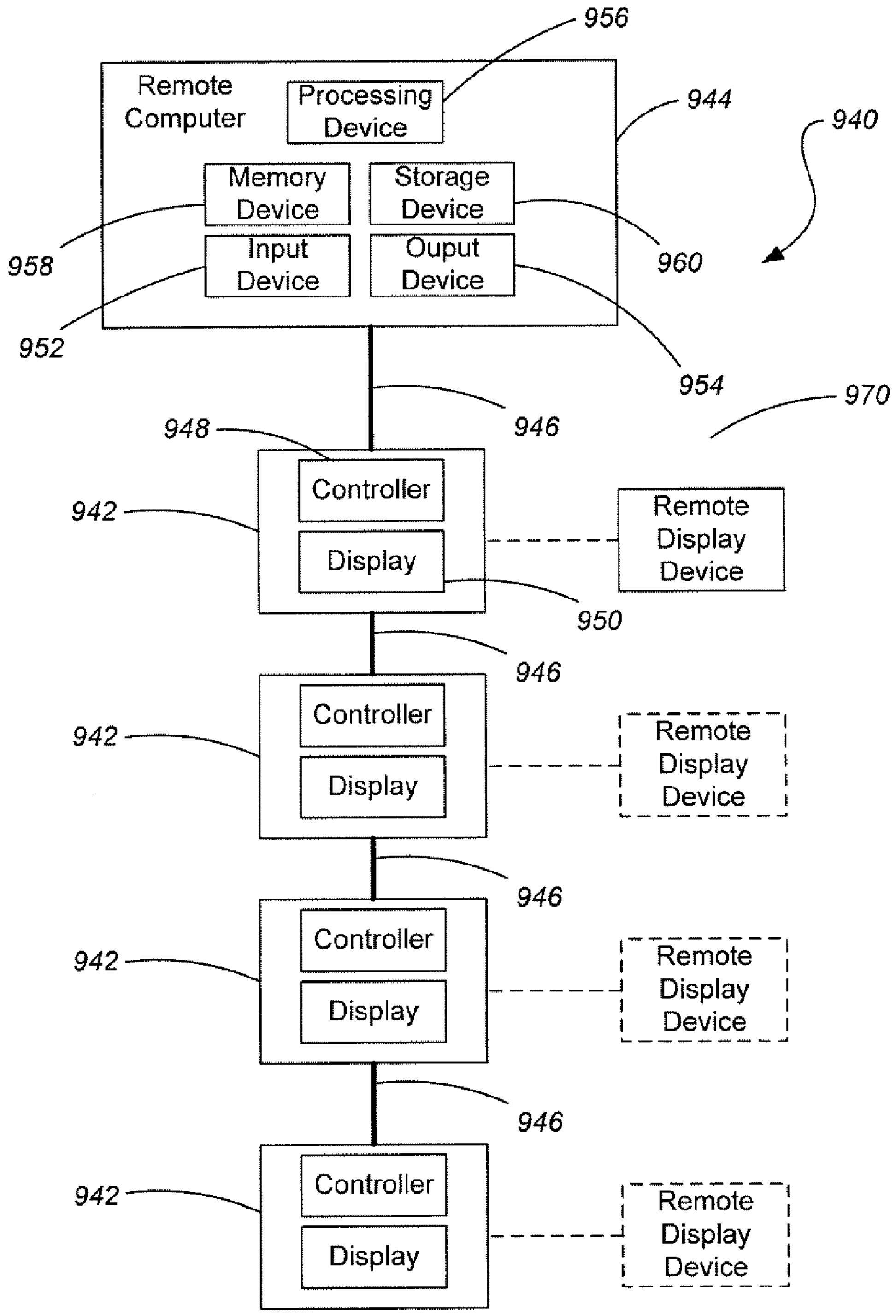
FIG. 10 is a block diagram of a network of automatic door systems according to an embodiment of the present invention.

FIG. 10 illustrates an embodiment of the invention comprising a network 940 according to an embodiment of the present invention. The network 940 may include one or more automatic door systems 942 and a remote computer 944 operably coupled to each automatic door system 942 through a communication line 946. The remote computer 944 may include, for example, one or more input devices 952 (e.g., keyboard, mouse, touch pads), output devices 954 (e.g., displays, printers), processing devices 956 (e.g., a central processing unit), memory devices 958 (e.g., random access memory, read only memory) data storage devices 960 (e.g., hard drives, solid state drives, DVDs, CDs) and may be configured to read and execute software associated with the operation of one or more automatic door systems 942.

Each automatic door system 942 within the network 940 may include a door system controller 948 and a monitor 950 which may include a display device. The door system controller 948 may comprise a door system controller (e.g., 318, 502, 602, or 806) as described in reference to FIGS. 3-9. Moreover, the monitor display 950 may comprise a monitor display (e.g., 320, 506, 606, or 808) as described in reference to FIGS. 3-9.

Each door system controller 948 within network 940 may be assigned a communication line address. As a non-limiting example, up to eight communication lines 946 may be coupled with the remote computer (although only a single communication line 946 is shown in FIG. 10), and each communication line 946 may include up to thirty-two separately addressed door system controllers 948.

The remote computer 944 may be configured to operate as a master device and may communicate with, and request status information from, each door system controller 948 on a communication line 946 by transmitting a specific door address along with a command and/or an instruction. Although each door system controller 948 on a communication line 946 may receive and decode all information transmitted from remote computer 944, only a specified door system controller having a matching address will respond or react to the transmitted request.

A remote display device 970 (which may include, for example, a remote display device 508, 608, or 908 as has been described with respect to FIGS. 3 through 9) may also be selectively and removably coupled to each door system controller 948. Each door system monitor display 950 may be configured to switch from a master mode to a slave mode, and vice versa, depending on whether a master device such as a remote computer 944 through communication line 946 or a remote display device 970, is in communication with controller 948. For example, in the event that the remote computer 944 is coupled to the communication line 946 and communication is established with the door system controllers 948, each door system display 950 may be configured to operate in a slave mode.

While operating, the door system controllers 948 may receive instructions and/or status requests from the remote computer 944. Upon receipt of an instruction and/or request, a door system controller 948, may perform an instruction and/or transmit status information to remote computer 944. Thereafter, the information may be displayed within remote display 952. Otherwise, if a master device, such as remote computer 944 is disconnected or loses communication with the door system controllers 948, each door system's monitor display 950 may operate in master mode wherein each door system controller 948 may display status information or instructions relating to the corresponding automatic door system 942 within the local monitor display 950 such as has been described above.

A contemplated operation of the network 940 including a remote computer 944 will now be described. At any time during operation, the remote computer 944 may send instructions and/or a status request along with an address on a communication line 946. After sending a request, the remote computer 944 may release the communication line and wait for a response from a specified door system controller 948. Each door system controller 948 coupled to a communication line 946 may receive the request, but only a door system controller 948 having a matching address will respond to the request. Upon receiving a request with a matching address, a corresponding door system controller 948 may transmit information to the remote computer 944. Thereafter, the door system controller 948 may release the communication line 946 to allow remote computer 944 to provide instruction to and/or request information from another door system controller 948 on the communication line 946. Information transmitted to the remote computer 944 may include, but is not limited to, controller status, alerts, and/or instructions. Upon receiving status information from a door system controller 948, the remote computer 944 may display the transmitted information via an appropriate output device 954. Furthermore, the status information of a door system controller 948 may also be displayed in the corresponding monitor display 950.

In an embodiment where the automatic door network 940 includes neither a remote computer 944 nor a communication line 946 (or in the situation where communication has been lost or terminated between a remote computer 944 and door system controllers 948), each door system's monitor display 950 may operate as a master device. While operating as a master device, each door system controller 948 may query the corresponding door system 942 for information, such as component status, alarms, alerts, and/or instructions. Upon receipt of information, the door system controller 948 may display the information in monitor display 950.

As noted above, the network 940 may include one or more remote display devices 970. The remote display device(s) 970 may include a programmer/emulator/tester (PET) device operably coupled to a single door system controller 948. Such a PET device may be used, for example, by an installer or maintenance personnel to program the automatic door system 942, to emulate certain situations the automatic door system 942 may encounter during operation, and to test the automatic door system 942.

As previously discussed, the remote display device 970 may become a master device and the door system's monitor display 950 which is tied to the uniquely addressed door system controller 948 may become the slave device. When the door system controllers 948 are coupled to a common communication line 946, the remote display device 970 may, by specifying an address of a given door system controller 948, become the master of any door system controller 948 on the communication line 946. Thus, each automatic door controller 948 may be programmed by the remote display device 970. Furthermore, the remote display device may request status information from each automatic door controller 948 similarly to the process employed by the remote computer 944 described above. When a remote display device 970 transmits control information to, or requests status information from, a door system controller 948, all door system controllers within network 940 may hear and decode the information on communication line 946, but only a door system controller with a matching address will respond and/or react to the request.

Specific embodiments have been shown by way of example in the drawings and have been described in detail herein; however, the various embodiments may be susceptible to various modifications and alternative forms. It should be understood that the invention is not intended to be limited to the particular forms disclosed. Rather, the invention includes all modifications, equivalents, and alternatives falling within the scope of the invention as defined by the following appended claims and their legal equivalents.

What is claimed is:

1. A monitoring system for automatic doors, comprising:

at least one automatic door system, each automatic door system of the at least one automatic door system comprising:

at least one door;

at least one input device configured to sense data representative of an operational parameter of the door system;

a door system controller operably coupled to the at least one input device and configured to receive the data representative of the operational parameter of the automatic door;

at least one remote display device interface operably coupled to the door system controller and configured to be operably coupled to at least one remote display device; and at least one monitor display operably coupled to the door system controller and configured to display information representative of the operational parameter of the door, wherein the at least one monitor display is configured to automatically switch from a master configuration to a slave configuration when the at least one remote display device is operably coupled to the at least one remote display device interface.

2. The system of claim 1, wherein when the at least one remote display device is operably coupled to the at least one remote display device interface, the at least one remote display device is configured to operate as a master device and display information representative of the operational parameter of the at least one automatic door system.

3. The system of claim 1, wherein the at least one monitor display is configured to automatically switch back to a master configuration when the at least one remote display device is decoupled from the at least one remote display device interface.

4. The system of claim 1, wherein the door system controller is configured to send end-user instructions relating to the operational parameter of the automatic door to at least one of the remote display device and the at least one monitor display.

5. The system of claim 1, wherein the operational parameter includes at least one of a system fault, a component status, and an alarm.

6. The system of claim 1, wherein the at least one input device comprises at least one of a sensor and a switch.

7. The system of claim 1, wherein the at least one input device comprises at least one sensor operably coupled to a power supply.

8. The system of claim 1, wherein the at least one door comprises a plurality of panels coupled together with a plurality of hinges.

9. The system of claim 1, wherein the at least one monitor display is located on a portion of the at least one door.

10. The system of claim 1, further comprising an actuator located and configured to selectively displace the at least one door.

11. The system of claim 1, wherein the at least one monitor display is located on a wall located adjacent a portion of the at least one door.

12. A method of monitoring an automated system, comprising:

providing at least one door system controller, each door system controller of the at least one door system controller having an input device interface and a display interface;

coupling at least one input device to the input device interface;

coupling a monitor display to the display interface;

coupling a remote display device interface to the display interface, wherein the remote display device interface is configured to couple a remote display device operating as a master device to the at least one door system controller;

transferring data representative of an operational parameter from the input device to the at least one door system controller;

configuring the monitor display to operate as a master device when the remote display device is not coupled to the remote display device interface and operate as a slave device when the remote display device is coupled to the remote display device interface;

sending a description of the operational parameter to the master device; and displaying the description of the operational parameter.

13. The method of claim 12, further comprising displaying a description of the operational parameter in the monitor display when the monitor display is operating as the slave device.

14. The method of claim 12, further comprising determining an operational parameter of the automated system through the at least one input device, wherein the operational parameter comprises at least one of a system fault, a component status, and an emergency event.

15. The method of claim 14, wherein the description of the operational parameter includes end-user instructions relating to the operational parameter.

16. The method of claim 12, further comprising:

coupling an audio transducer to the processing circuit;

transferring audio data representative of the description of the operational parameter from the processing circuit to the audio transducer; and playing the audio data through the audio transducer.

17. A network of automatic door systems, comprising:

at least one communication line;

a plurality of automatic door systems operably coupled to the at least one communication line, each automatic door system of the plurality of automatic door systems comprising:

at least one door;

at least one input device configured for determining at least one operational parameter of the automatic door system; and a door system controller operably coupled to the at least one input device and configured to request and receive data representative of the at least one operational parameter of the automatic door system from the at least one input device, the door system controller including at least one monitor display, wherein the at least one monitor display is configured to display indicia of the data representative of the operational parameter and wherein the at least one monitor display is configured to switch from a master mode to a slave mode upon operative coupling to at least one remote display device interface.

18. The network of automatic door systems of claim 17, further comprising a remote computer operably coupled to the at least one communication line and configured to operate as a remote display device interface, wherein the remote computer is further configured for requesting the data representative of the operational parameter of each automatic door system of the plurality of automatic door systems.

19. The network of automatic door systems of claim 18, wherein the remote computer comprises an output device configured to display indicia of the data representative of the at least one operational parameter of each automatic door system of the plurality of automatic door systems.

20. A method of monitoring a network of automatic door systems, comprising:

establishing a communication line between a plurality of automatic door systems, wherein each automatic door system of the plurality of automatic door systems includes a door system controller having at least one monitor display configured to switch from a master mode to a slave mode upon operative coupling to at least one remote display device interface;

requesting information from an automatic door system controller of the plurality of automatic door systems, wherein the information is related to an operational parameter of an automatic door system of the plurality of automatic door systems; and displaying the information on a display device.

21. The method of claim 20, further comprising providing a remote computer operating as a remote display device interface on the communication line.

22. The method of claim 20, further comprising coupling a remote display device to a door system controller of an automatic door system of the plurality of automatic door systems.

23. The method of claim 21, wherein displaying the information comprises displaying the information via an output device of the remote computer.

24. The method of claim 20, wherein requesting information comprises transmitting an address and at least one of a status request and at least one instruction from a master device.

25. The method of claim 20, wherein displaying the information comprises displaying information in a display device within the at least one monitor display.

* * * * *

UNITED STATES PATENT AND TRADEMARK OFFICE

CERTIFICATE OF CORRECTION

PATENT NO. : 7,737,860 B2
APPLICATION NO. : 11/871772
DATED : June 15, 2010
INVENTOR(S) : Banta et al.

It is certified that error appears in the above-identified patent and that said Letters Patent is hereby corrected as shown below:

In the drawings, Fig. 5 should be replaced with the corrected Fig. 5 as shown below.

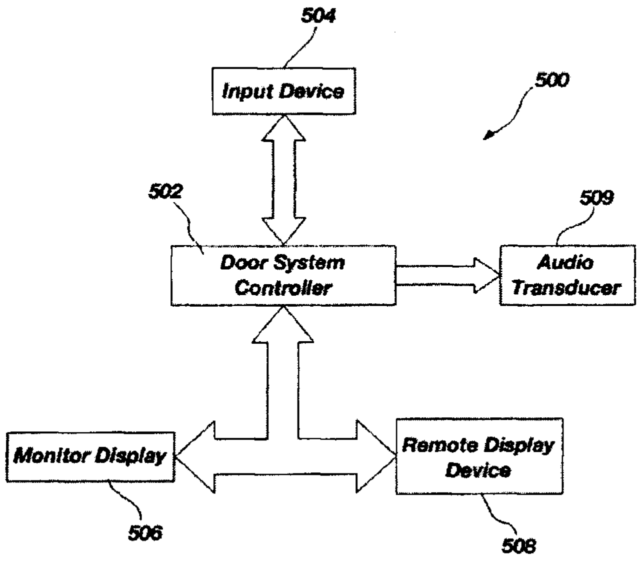

FIG. 5

Signed and Sealed this
Eleventh Day of February, 2014

Michelle K. Lee
*Deputy Director of the United States Patent and Trademark Office*